April 8, 1952 M. L. JEFFREY 2,592,426
SOLDERING IRON
Filed Feb. 7, 1947 2 SHEETS—SHEET 1
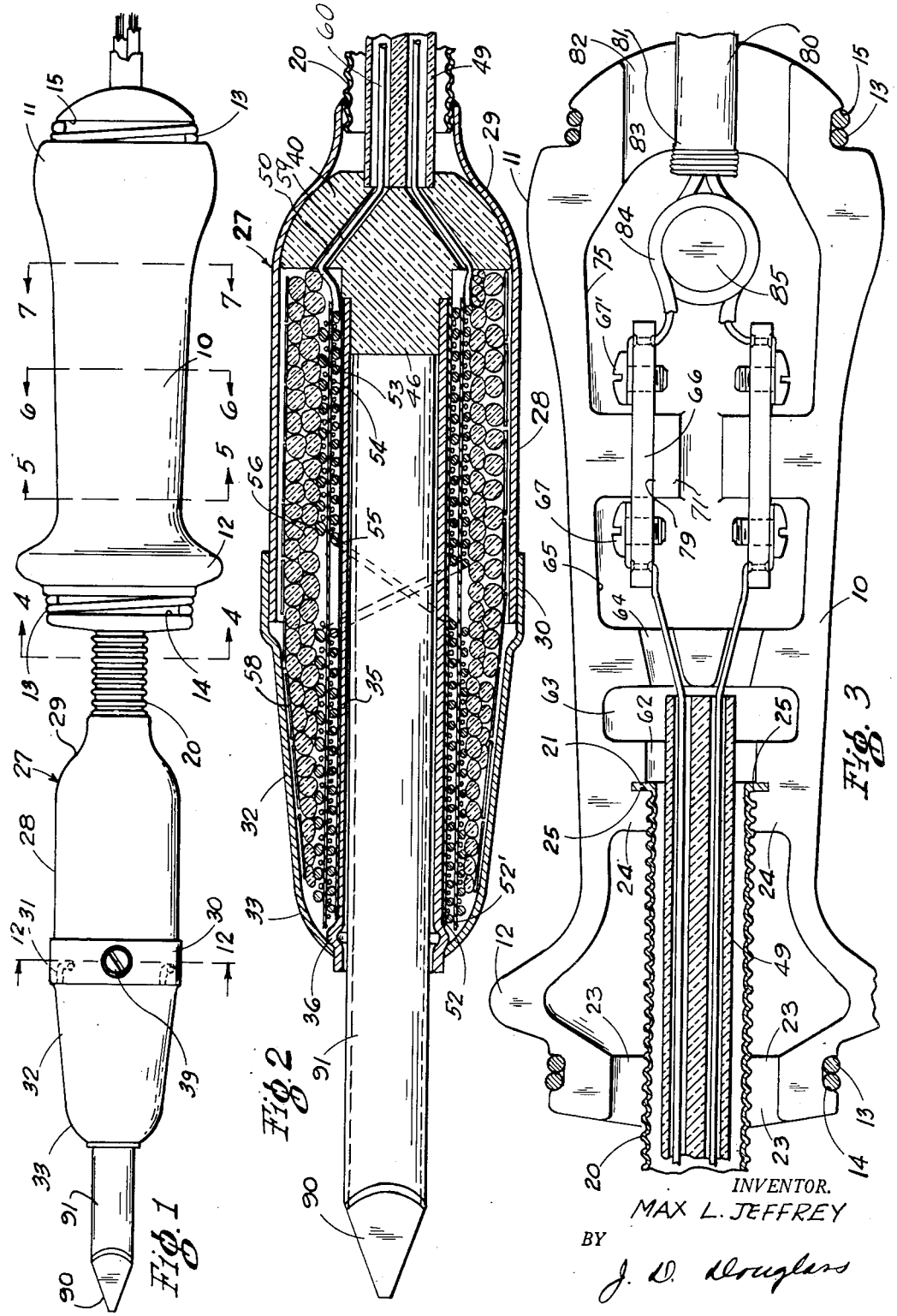
INVENTOR.
MAX L. JEFFREY
BY
J. D. Douglass April 8, 1952  M. L. JEFFREY  2,592,426
SOLDERING IRON
Filed Feb. 7, 1947  2 SHEETS—SHEET 2
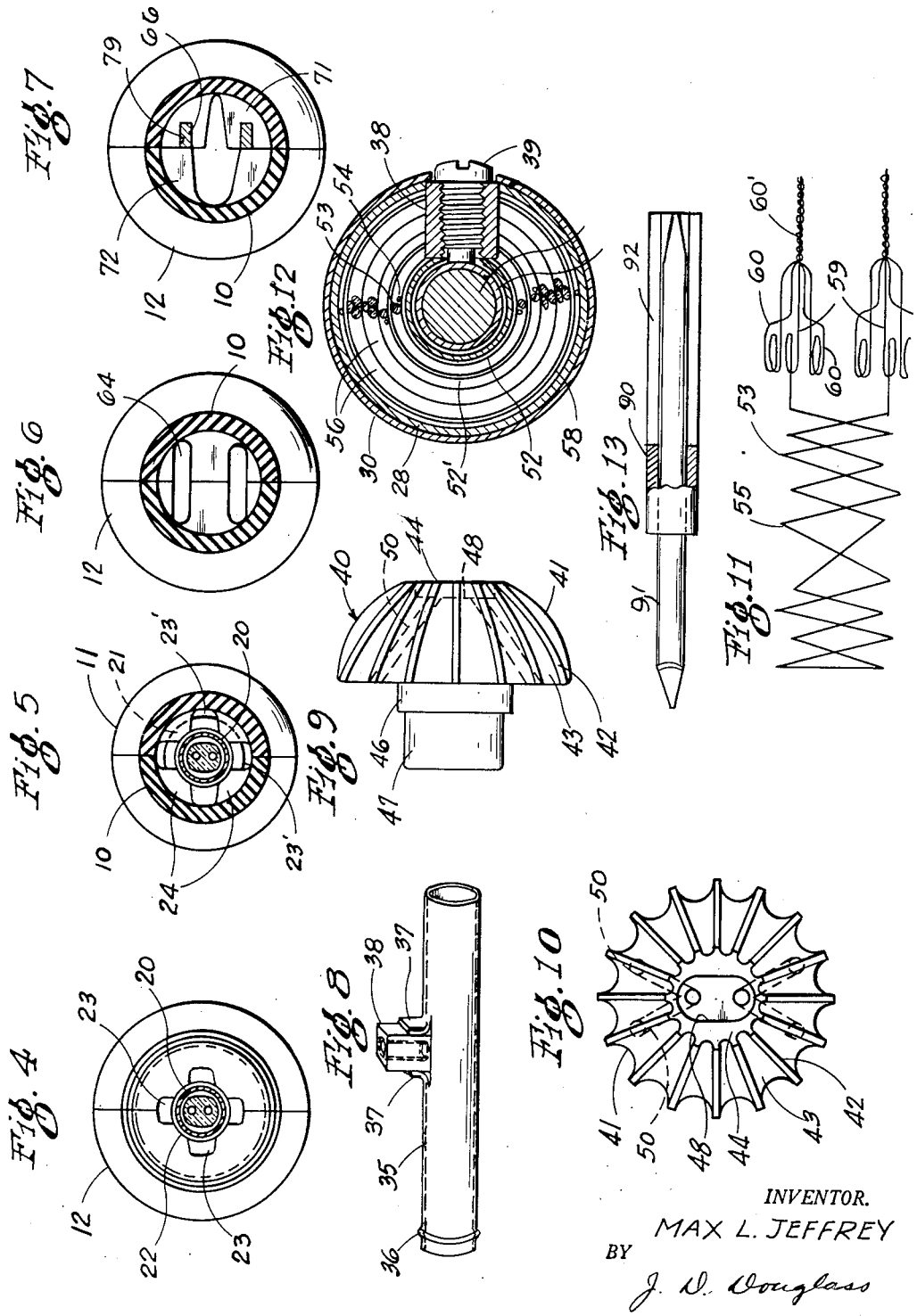
INVENTOR.
MAX L. JEFFREY
BY
J. D. Douglass

UNITED STATES PATENT OFFICE 2,592,426

SOLDERING IRON

Max L. Jeffrey, Shaker Heights, Ohio

Application February 7, 1947, Serial No. 727,113

5 Claims. (Cl. 219—26)

This invention relates to improvements in electrically heated devices, and more particularly to an electrically heated soldering iron.

Heretofore, soldering irons have had many structural and operational weaknesses. Perhaps one of the greatest disadvantages in the prior irons has been that the heat is not confined to the tip or bit, but is dissipated to a large extent through the housing which encloses the heating element. This heat was also transmitted, to a considerable extent, to the handle which often becomes too hot for comfortable use. This distribution of heat to undesired places resulted in a loss in efficiency, often causing the bit to be cooler than is desirable and making it necessary to design a hotter heating element in order to maintain the temperature of the bit for effective operation.

Still another disadvantage in prior irons resided in the fact that the strains to which the line cords were subjected were transmitted to the connections within the iron sometimes actually to the heating element, placing undue strains on these connections and/or the heating element making frequent replacement or repair necessary.

The replacement of the cords is a difficult and time consuming job and is made more difficult by the fact that the results of corrosion hindered the easy disassembly of the parts. Very often an otherwise good tool would be discarded because of the difficulty of replacing a cord.

Another disadvantage resided in the fact that copper, when heated, oxidizes. This oxide causes the bit to "freeze" in the heating element and also acts as a thermal insulator preventing efficient transfer of heat from the heating element to the bit. This oxidization occurs, not only on that part of the bit which is disposed inside the heating element, but also is present on the exterior end, and causes the bit to materially deteriorate and render frequent tinning necessary. Actually, the bit will thin down in time so that it wears out, not necessarily from the end, but from the side. Although the bit can be removed and cleaned, which is recommended, such cleaning is time consuming, causes the diameter of the bit to be smaller, and results in a greater clearance between the bit and the wall of the heating element, and effects a reduction of the heat transferring ability from the heating element to the bit.

Another disadvantage resides in the fact that, normally, as the end of the bit wears down, it is adjusted outward. Eventually, a very short bit will be in use, with the result that only a minor portion extends into the heating element which decreases the heat at the bit and increases the heat in the element, causing serious damage thereto.

By my present invention, I have provided a soldering iron wherein the heat is, to a greater extent, confined to the bit where it belongs. It is, to a considerable extent, prevented from radiating from the heating element to the housing or from being transmitted to the handle. The handle is kept cool, further, by an improved construction such that the heat in the wire of which the element is constructed is confined where it belongs and the lead wires from the element are reinforced which strengthens them as well as lowering their resistance, preventing heating therein. This allows an iron to be constructed which may be shorter than the conventional irons, increasing the facility with which it may be used and decreasing the tendency of the user to become tired. Furthermore, means are provided to isolate the heater wire against strain and a strong mechanical and electrical connection is provided for the lead wires to the line cord. Likewise, the line cord is isolated mechanically from the connection so that strains on the cord will not be transmitted to the connector.

Still other advantages and improvements in construction will become more apparent as this description proceeds, the description being illustrated by the accompanying drawings, and forming a part of this specification.

In the drawings:

Fig. 1 is a full sized elevational view of a soldering iron embodying my invention;

Fig. 2 is an enlarged vertical view of the heating element end of the tool;

Fig. 3 is a view of the handle with one half removed and with certain parts shown in section;

Figs. 4, 5, 6, and 7 are sectional views taken on the lines 4—4, 5—5, 6—6, and 7—7 of Fig. 1, as indicated;

Fig. 8 is a perspective view of the heater element supporting core, prior to assembly;

Fig. 9 is a view, in side elevation, of an insulating and core supporting plug;

Fig. 10 is an end elevational view of the plug of Fig. 9;

Fig. 11 is a diagrammatic view of the heater coil and its leads;

Fig. 12 is a sectional view taken along the line 12—12 of Fig. 1; and

Fig. 13 is a sectional view of a modified form of tip and its cooperating bushing.

Throughout the drawings like parts have been designated by like reference characters.

Briefly, my invention contemplates a handle of two parts which are separable longitudinally and are held together by spring wire clamping rings disposed in grooves surrounding the handle. The handle clamps a stem which extends from the handle and supports a heater element housing. The heater element housing is constructed of two shells held together on their mid portions by a bayonet joint. The shells support a core of stainless steel and the heating element is wrapped around the core in insulated condition.

The heating element is in close thermal transmission relation with the core and is insulated thermally from the housing. The bit is comprised of a copper core having a stainless steel shell, the copper of which extends beyond the confines of the shell to permit easy tinning thereof. The bit is held in the heating element by a screw which extends through the midportion of the housing, thus making it necessary for the bit to always have a predetermined length disposed in the heater. Connector means is provided for the line cord to the heater element leads, and means is provided for the line cord to prevent physical strains being transmitted to the connector means. The heating element leads are reinforced by additional wires which are twisted together with the leads to strengthen the leads and lower their resistance and prevent heating in the leads. Additionally, these wires are connected to a support which prevents strains being transmitted to the heater element. The handle is provided with ventilating passages therethrough which assist in cooling, and the metal parts are made of stainless steel which limits the transmission of heat and eliminates corrosion.

As best shown in Figs. 1 and 3 to 7, the handle includes a body portion 10 of generally circular cross section and which gradually enlarges from the section 5—5 toward the extremity and terminates in an enlarged substantially spherical portion 11. The other end is provided with an outwardly extending flange 12 which is provided with curved walls merging gradually with the body 10. I have found that a handle so proportioned provides a convenient and comfortable hand grip, allowing the iron to be used for long periods without tiring the user.

The body is split longitudinally, being formed of two complementary parts which are held together by spring wire rings 13 disposed in grooves 14 and 15 formed in and extending circumferentially around the body. The spring rings may comprise one or more convolutions that may be readily slipped in or removed from the grooves.

As best shown in Figs. 3, 4 and 5, the handle is hollow to provide ventilating channel therethrough.

A stem 20 is supported by the handle and comprises a tube of stainless steel, the body of which is formed with circumferential corrugations. The end which extends farthest into the handle has an outwardly extending flange 21 at its extremity. The tube is supported by projections 22 which extend inwardly of the body of the handle and abut the tube on opposite sides, the spaces 23 between the projections being part of the air ducts previously mentioned.

Similar abutments, or lugs 24, are provided in the handle adjacent the end of the tube, and the flange 21 on the end of the stem is engaged in circumferentially extending slots 25. It should be noted, as can best be seen in Fig. 5, that the flange 21 does not extend entirely around the end of the stem, but extends slightly more than half way around the stem. Likewise, the slot 25 only extends part way around the inside of the handle. Thus, the stem is held securely in the handle, without the use of the screws and cannot turn or pull out. Ducts 23' likewise extend between the lugs 24.

The stem 20 has secured thereto, at or adjacent the other end by welding, a housing member or shell 27 which includes the cylindrical part 28 and the part 29 which flares inwardly to meet the stem. The other part of the housing includes a shell having a cylindrical part 30 adapted to telescope over the end of the housing 28 and may be secured thereto by a bayonet connection 31 (Fig. 1). The body of the shell is formed as a frustum of a cone at 32 and terminates in an inwardly curved part 33 at its end.

Preferably, the housing is formed of stainless steel, and may be formed in dies or by spinning.

A hollow stainless steel heater element core or support is provided (Fig. 8) and comprises a tubular body 35 which is preferably formed from a flat strip formed into a tubular form. It is provided with a bead 36 adjacent one end, and intermediate its ends the material is struck outwardly to provide lugs 37 between which a sleeve 38 is secured as by welding. Forming the support from a flat sheet facilitates forming the bead and the lugs 37. The interior of the sleeve 38 is threaded to receive therein the bit holding screw 39 which may be of stainless steel.

The coil support is itself supported at one end by the curved portion 33 which engages the end of the support snugly adjacent the bead 36, the housing engaging the support on the outer side of the bead and thus holding the support in the housing. The other end of the coil support is supported by an insulator 40 which may be a heat resisting ceramic known in the trade as "Alsimag," (Fig. 9). This comprises a head 41 provided with alternate ribs and grooves 42 and 43 which extend radially from the flattened end 44 over the periphery of the head. The general contour of the head, defined by the edges of the ribs 42 is such as to provide a close supported contact for the insulator, with the interior of the housing shell 29.

Opposite to the head 40, the insulator is provided with a stem 46 having a part 47 of reduced diameter adapted to extend into the end of and support the coil support (see Fig. 2). The flat end 44 of insulator is also provided with a recess 48 formed to receive the end of an insulator tube 49. From the bottom of the recess 48, pairs of diverging ducts 50 extend, which ducts open at the base of the head spaced from the stem 46. These ducts are provided for the lead wires as later described.

The coil support is preferably constructed of stainless steel which is highly resistant to oxidation or corrosion, and is supported as described coaxial with and by the shells that form the housing.

The heating element which may be of a nickle-chromium alloy, or any other type of resistance wire, is wrapped around the support, insulated therefrom electrically. It is thermally as well as electrically insulated from the housing.

As best illustrated in Fig. 2, a sheet of mica 52 is first wrapped around the coil support and then one layer of the wire 53 is wound on the support. The wire is space wound on the support, the spacing being determined by a glass cord 54 which is wound between the convolutions of the wire, the two being wound simultaneously. Adjacent the center of the support, the convolutions are widely spaced, as indicated at 55 so that they do not interfere with or touch the sleeve 38. After the first layer of wire is applied, a second sheet of mica 52' is wrapped over the first layer, and the second layer together with its spacing cord is laid on the second sheet of mica. Over the second layer is wound a sufficient quantity of asbestos rope 56 to hold the heater windings in place and to fill the space between the heater windings and the interior of the shell.

Finally, the asbestos is covered by fiber glass electric tape 58 which is wrapped over the asbestos rope, after which the housing shells are placed in position and locked by the bayonet lock 31. The tape serves as additional insulating material as well as holding the parts in position.

It will be appreciated that the insulator plug 40 may be inserted in the support prior to winding if desired, and the leads 59 for the heating element which comprise continuations of the heating element are brought out through the ducts 50.

It is desirable that the leads be securely held in place so that the winding will not come loose and also that beyond the insulator they do not heat. In order to effect these results, each of the leads 59 is brought out through one of the ducts 50, returned through the other duct and then brought back out through the original duct to provide a loop of wire through the insulator. Also looped in the same manner, through the ducts in the insulator are two other wires 60 which may be made of the same material, so that altogether there are three wires looped around through the ducts. This arrangement is shown diagrammatically in Fig. 11. The three wires, where they emerge from the duct, are trained through the insulator 49, one end of which is supported in the recess 48, and the other end of which extends through the stem 20 into the handle and is engaged by inwardly extending lugs 62 in a manner similar to that in which the stem is so engaged. For the purpose of clarity of description only one lead 60 is shown in Fig. 2.

The end of the insulator 49 extends into a cavity 63 opposite to a pair of ducts 64 which extend from the cavity 63 to a connector cavity 65.

The wires, at their point of emergence from the ducts 50, are preferably twisted together as indicated at 60' to provide intimate contact therebetween. The twisted portions extend through the insulator 49, ducts 64 into the cavity 65 where they are securely connected to a connector bar 66 by a screw 67.

Although I have described the wires 60 and 59 as being threaded through the ducts 50 prior to twisting of the ends, it will be appreciated that it may be desirable to twist all the wires together prior to threading so that the wires are twisted even in the part disposed in the ducts. The preferred form, however, first described, eliminates the possibility of there being any free ends, since all of the free ends are brought out to and secured to the connector bar 66. This arrangement, because the wires are in intimate contact, reduces the resistance of the lead-in wires as well as strengthening the wires. The reduction in resistance results in confining the heat to the coil where it belongs and eliminates the generation of heat in the lead itself. The looping of the wires about the insulator also prevents strain from being applied to the winding.

The connector bars 66 are supported in slots 79 extending through projections 71 extending from the wall of the handle, and are held in place by abutting members 72 carried by the opposite handle section (Fig. 7).

The other ends of the connector bars 66 extend into the cord cavity 75 in the portion 11 of the handle.

The line cord 80, which may be provided with an armor in the form of a spring-wound tube 81, extends from the exterior into the cavity 75, being engaged by lugs 82 between which are the channels 83. The separate wires 84 of the line cord are looped about a post 85 and then connected to the connector bars by the screws 67'.

The soldering bit preferably comprises a core 90 of copper having a shell 91 of appreciable thickness of stainless steel. When the bit is provided with the desired point, the copper is exposed which permits easy tinning of the copper. If desired, the bit may have a tip on one end only, or, as shown in Fig. 13, it may have a square point on one end and a chisel point on the other.

By providing the shell of stainless steel, which may be formed by drawing or rolling a tube onto the copper, I can decrease the clearance materially between the coil support and the bit, providing a close sliding fit, and thus a more efficient heat transfer. No clearance for the formation of the usual oxides need be made because the stainless steel does not readily oxidize.

As shown in Fig. 13, this structure also adapts itself to a modified form of bit of small diameter. When a small bit is used, it is also desirable to reduce the heat; for instance, with a ⅜" diameter tip the temperature desired ranges from 850 to 900 degrees. When a small tip is used, this temperature may desirably be reduced to between 700 and 750 degrees.

In the modified form of tip, assuming the opening in the coil support is ⅜" in diameter, I provide a stainless steel bushing 90 of ⅜" in outside diameter to provide a close fit with the interior of the coil support and a stainless steel clad copper tip 91 of ¼" outside diameter which is slidable in the bushing. The bushing is split longitudinally as indicated at 92.

In the case of the tip shown in Figs. 1 and 2, the screw 39, when screwed down in the sleeve 38, engages with the tip and holds it securely in position. When the modified form of tip is used, the screw engages the bushing with sufficient pressure to deform it and hold the tip in place.

Because the heat conducting properties of stainless steel are less than in copper, the additional bushing affords the desired reduction in heat for the smaller tip. Because a smaller tip erodes faster than a large tip, the replacement expense is less since the tip is ¼" in diameter throughout its length and does not need the larger body as commonly used where small tips are desired. Furthermore, being small through its length, it is usable for a greater portion of its length without the need of grinding the body away as the tip is used up.

It will, therefore, be appreciated that I have provided a soldering iron where the heat in the handle is practically non-existent due to the manner in which it is ventilated. Since the stainless steel tube or stem is a poor conductor of heat and also because of the lessened contact area, little or no heat is conducted to the handle, nor is it radiated from the housing. This allows a shorter and lighter iron to be made which will have the same heating capacity as a conventional larger iron. The insulation between the heating element and the housing also retains the heat at the core where it is desired. The stainless steel construction of the bit and the coil supporting core enables a close fit between the bit and the core, prevents corrosion, and results in a long life thereof.

The manner in which the wires are secured provide for securely holding them in place eliminating strains and also increases the life.

The two part construction of the handle permits easy assembly and provides for easier accessibility in event of repair. The two part construction of the housing also facilitates assembly and repair.

Having thus described my invention, I am aware that numerous and extensive departures may be made therefrom without departing from the spirit or scope of my invention.

I claim:

1. A soldering iron including a stainless steel housing, an insulating plug disposed in said housing adjacent an end, a stainless steel hollow core for said housing comprising a tubular member connected to said plug at one end of the housing, the other end of said core being formed with a circumferential bead, said housing having an inwardly extending wall adapted tto engage and support said core at the other end adjacent said bead, said core having an opening in one side at its mid portion, a threaded sleeve disposed in said opening and extending into an opening in said housing, means disposed in said sleeve and movable into said core, a soldering bit removably disposed in said core and adapted to be engaged by said means to hold it in position in the core and heating means disposed around the core inside the housing and electrically insulated from the core and thermally and electrically insulated from the housing.

2. A soldering iron including a stainless steel housing, an insulating plug disposed in said housing adjacent an end, a stainless steel hollow core for said housing comprising a tubular member connected to said plug at one end of the housing, the other end of said core being formed with a circumferential bead, said housing having an inwardly extending wall adapted to engage and support said core at the other end adjacent said bead on the side of the bead adjacent the end of the core, said core having an opening in one side at its mid portion, a threaded sleeve disposed in said opening and extending into an opening in said housing at the mid portion of the housing, screw means disposed in said sleeve and movable into said core, a soldering bit removably disposed in said core and adapted to be engaged by said screw means to hold it in position in the core and heating means disposed around the core inside the housing and electrically insulated from the core and thermally and electrically insulated from the housing.

3. A soldering iron including a housing, an insulating plug disposed in said housing at one end, a hollow core for said housing having one end supported by said plug and the other end supported by an inwardly curved wall of said housing, said core extending beyond the confines of the housing at one end, a heating element for said core comprising a heating wire electrically insulated from the core and wrapped around the core, means to separate the adjacent turns of said heating wire comprising an insulating member of glass cord wrapped around the core between adjacent convolutions of the heating element.

4. A soldering iron including a housing, an insulating plug disposed in said housing at one end, a hollow core for said housing having one end supported by said plug and the other end supported by an inwardly curved wall of said housing, said core extending beyond the confines of the housing at one end, a heating element for said core comprising a heating wire electrically insulated from the core and wrapped around the core, means to separate the adjacent turns of said heating wire comprising an insulating member of glass cord wrapped around the core between adjacent convolutions of the heating element, and means to insulate the heating element from the housing comprising an asbestos rope wound over the heating element and substantially filling the housing.

5. A soldering iron including a housing, a hollow stem extending from one end of the housing, a member of insulating material disposed in the end of the housing adjacent the stem and provided with a head having a plurality of longitudinally extending channels adjacent the housing, ribs intermediate the channels for engagement with the housing, an axial stem on said member, a hollow core for said housing having one end in supported engagement with said stem and the other end supported by the other end of said housing, a heating wire wound on said core and electrically insulated from the core and electrically and thermally insulated from the housing, said member being provided with duct like openings extending from the hollow stem side divergingly toward and opening into the housing on opposite sides of said stem, said heating element having lead portions extending through said openings, and auxiliary wires in twisted engagement with said lead portions extending through said openings and being looped around said member in said grooves to tie the lead portions to said member and lower the resistance of the wire at points extending from the heating element.

MAX L. JEFFREY.

REFERENCES CITED

The following references are of record in the file of this patent:

UNITED STATES PATENTS

| Number | Name | Date |
|---|---|---|
| 925,056 | Van Aller | June 15, 1909 |
| 1,079,066 | Rice | Nov. 18, 1913 |
| 1,372,778 | Sands | Mar. 29, 1921 |
| 1,431,039 | Quednow et al. | Oct. 3, 1922 |
| 1,497,623 | Young | June 10, 1924 |
| 1,749,396 | Schylander | Mar. 4, 1930 |
| 1,810,164 | Fay et al. | June 16, 1931 |
| 2,102,839 | Dohrman | Dec. 21, 1937 |
| 2,213,438 | Young | Sept. 3, 1940 |
| 2,224,585 | Abbott | Dec. 10, 1940 |
| 2,257,376 | Grey | Sept. 30, 1941 |
| 2,274,408 | Hampton et al. | Feb. 24, 1942 |
| 2,274,817 | Zimmer | Mar. 3, 1942 |
| 2,311,776 | Powell | Feb. 23, 1943 |
| 2,366,910 | Kollath | Jan. 9, 1945 |
| 2,414,482 | Norman | Jan. 21, 1947 |
| 2,455,720 | Young | Dec. 7, 1948 |

FOREIGN PATENTS

| Number | Country | Date |
|---|---|---|
| 195,264 | Great Britain | Mar. 29, 1923 |
| 484,651 | Great Britain | May 9, 1938 |
| 525,117 | France | Apr. 14, 1920 |
| 552,837 | Great Britain | Apr. 27, 1943 |
| 562,661 | Great Britain | July 11, 1944 |
| 694,968 | France | June 7, 1934 |